United States Patent [19]

Nishida

[11] Patent Number: 5,319,664
[45] Date of Patent: Jun. 7, 1994

[54] ION LASER TUBES

[75] Inventor: Kazuhisa Nishida, Tokyo, Japan

[73] Assignee: NEC Corporation, Tokyo, Japan

[21] Appl. No.: 37,374

[22] Filed: Mar. 26, 1993

[30] Foreign Application Priority Data

Mar. 30, 1992 [JP] Japan .................................. 4-071822

[51] Int. Cl.$^5$ .............................................. H01S 3/03
[52] U.S. Cl. ........................................ 372/61; 372/62; 372/55
[58] Field of Search ............................. 372/61, 62, 55

[56] References Cited

U.S. PATENT DOCUMENTS 4,912,719  3/1990  Kanamoto et al. .................... 372/61

Primary Examiner—Léon Scott, Jr.
Attorney, Agent, or Firm—Young & Thompson

[57] ABSTRACT

The invention provides an ion laser tube in which a TiC or B$_4$C coating layer having excellent durability to plasma bombardment and an alumina coating layer for preventing oxidation of TiC and B$_4$C are provided on an inner face of a central hole in an SiC capillary member, whereby stability to electric discharge or plasma bombardment increases and properties of the ion laser tube are stabilized. Thus, the sputtering resistance is improved and degradation of the laser properties is suppressed.

4 Claims, 5 Drawing Sheets

ION LASER TUBES

BACKGROUND OF THE INVENTION

1. Field of the Invention

This invention relates to an ion laser tube and in more particular to an ion laser tube having a ceramic capillary member with a high laser power being obtained due to discharge of a large electric current.

2. Description of the Related Art

Generally, in case of ion laser tubes in which laser oscillation is generated by transition between energy levels of ionized gas obtained due to ionization of a gaseous active medium such as argon, krypton or the like, ion density musk be increased in order to obtain a high laser power. To this end, it is sometimes necessary to apply a large electric current of not less than 30 amperes to a discharge path in a capillary member. Therefore, it has been required that a plasma capillary member and an envelope are made of a high thermal conductivity material which is capable of efficiently removing heat generated in the plasma capillary member due to the large electric current, and further that the material for the capillary member has a good durability to high ion density.

Recently, silicon carbide (SIC) and aluminum nitride (AlN) have been used as materials of satisfying the requirements as mentioned above.

Referring now to FIG. 1, which shows a longitudinal section of a conventional ion laser tube, the ion laser tube has a plurality of incorporated capillary members 17 each having a flanged SiC capillary member 1 with a central hole 2 for an electric discharge path and an AlN envelope 6 in which the capillary member 1 is accommodated or incorporated, the envelope 6 being provided with a plurality of gas return holes 5 and being constructed at the same angular intervals to surround the central hole 2, and the capillary member 1 and the envelope 6 being bonded and secured to each other by solder glass such as fritted glass 7. The plurality of incorporated capillary members 17 are coaxially arranged along a capillary axis of the ion laser tube and in series connected and secured to one another by using an appropriate implement (not shown) and fritted glass 9. The capillary members 1 are spaced apart from each other. An end of a cylindrical borosilicate glass member 10 is connected and secured to each end of the outermost capillary members 17. Furthermore, each of a pair of metal dishes 13 equipped with an anode electrode 11 and a cathode electrode 12, respectively, is connected and secured to the other end of each borosilicate glass member 10 and a Brewster window 14 is secured to a tip end of a tubular member 19 at an angle inclined to the laser capillary axis, the tubular member 19 extending outwardly from a central portion of each metal dish 13. And the ion laser tube is completed by sealing a prescribed amount of argon gas therein. The gas is charged and exhausted through a metal tube 18.

The above-mentioned ion laser tube and its modifications are taught in U.S. Pat. No. 4,912,719, the disclosure of which is hereby incorporated by reference herein.

In the above-mentioned conventional ion laser tube, however, the SiC capillary member is easily sputtered by electric discharge and thus the composition thereof deviates from stoichiometric composition (SiC=1:1). Consequently, there is an obstacle that the laser power is sharply lowered and has a short life.

Furthermore, it is very difficult to make the SiC member having the stoichiometric composition because of variation in manufacture.

SUMMARY OF THE INVENTION

It is an object of this invention to provide an ion laser tube with a high resistance to sputtering and good laser properties.

The above object of the invention is accomplished by providing an ion laser tube having a plurality of cylindrical silicon carbide capillary members arranged along a laser axis of the laser tube; a plurality of cylindrical aluminum nitride envelopes, each of the capillary members having a central hole for an electric discharge path along the laser axis, each of the envelopes having a plurality of gas return holes and a through-hole for accommodating each of the capillary members therein, the envelopes, in each of which each of the capillary members is accommodated, being airtightly secured to one another so as to form the electric discharge path; and an anode electrode and a cathode electrode provided at both ends of the electric discharge path, respectively, and comprising having a first titanium carbide or boron carbide coating layer and a second alumina coating layer in order on an inner face of the hole for the electric discharge path.

DETAILED DESCRIPTION OF THE PREFERRED EMBODIMENTS

In an ion laser tube of this invention, a first coating layer comprising titanium carbide (hereinafter referred to as "TiC" for simplicity) or boron carbide (hereinafter referred to as "$B_4C$" for simplicity) having good durability to plasma bombardment and a second coating layer comprising alumina for preventing oxidation of TiC and $B_4C$ are formed in order on an inner face of a central hole (i.e. a capillary) in an SiC capillary member. The first coating layer has a thickness of about 0.5 to about 1.0 mm and the second coating layer has that of about 10 to about 50 μm. In a process of assembling the laser tube, the SiC member must be treated at high temperature under air. If the alumina layer is not formed and as a result the TiC layer and $B_4C$ layer are exposed to air, TiC and $B_4C$ are oxidized by the treatment at high temperature under air to form $TiO_2$, $B_2O_3$ or the like. This leads to a lowering tendency in the durability to plasma bombardment. In this invention, therefore, it is necessary and essential to prevent the oxidation of TiC and $B_4C$, i.e. to form a protective film for preventing the oxidation.

Next this invention will be described in more detail with reference to accompanying drawings. Of course, this invention is not limited to the embodiments chosen and it is possible to envisage other variations thereon without departing from the scope of the invention.

Figure 1:
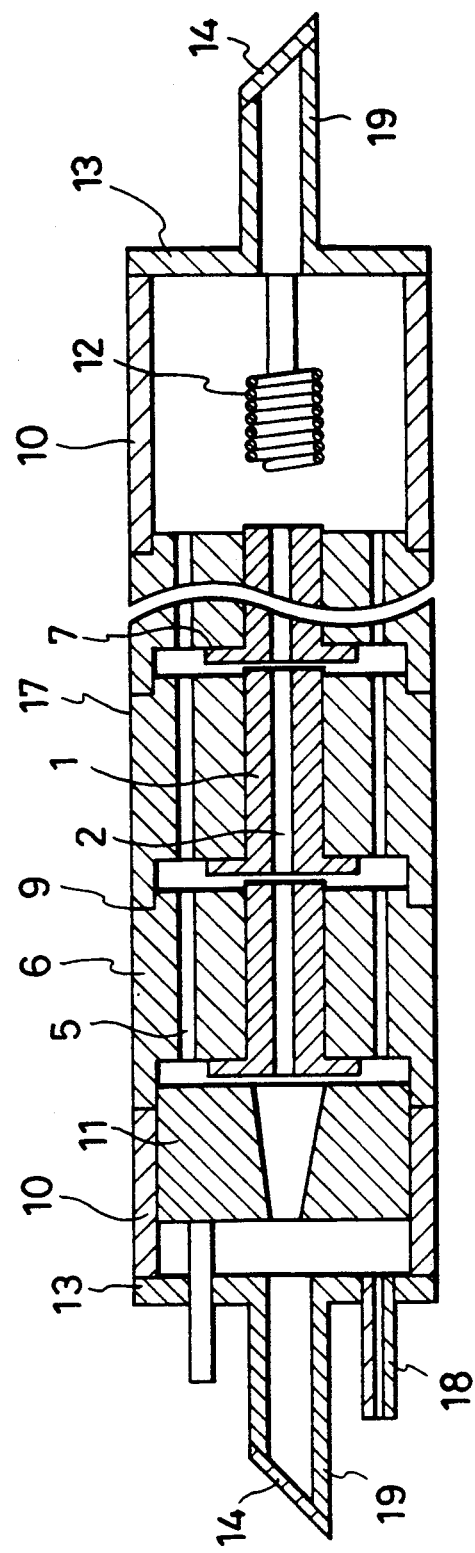
FIG. 1 shows a longitudinal section of a conventional ion laser tube.
Figure 2:
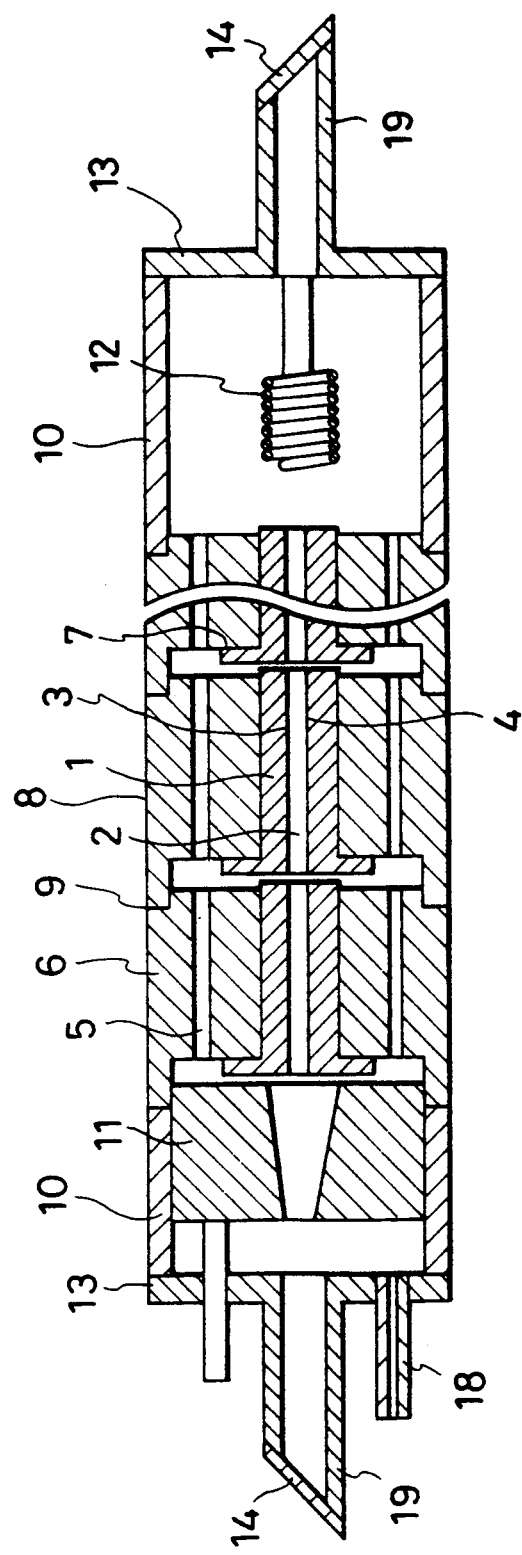
FIG. 2 shows a longitudinal section of an ion laser tube of a first embodiment according to this invention.
Figure 3:
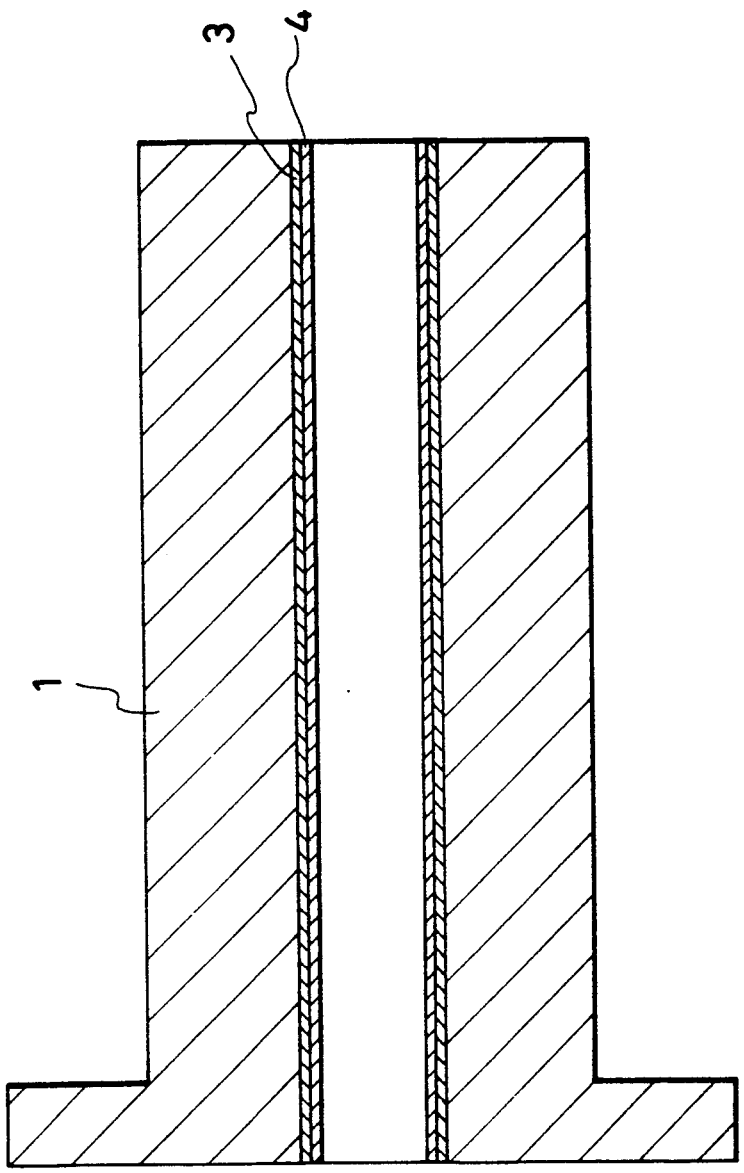
FIG. 3 shows an enlarged sectional view of an SiC capillary member in the ion laser tube shown in FIG. 2.

FIG. 2 is a longitudinal section of an ion laser tube of a first embodiment according to this invention and FIG. 3 is an enlarged sectional view of an SiC capillary member in the ion laser tube shown in FIG. 2. All parts and/or elements which are identical to those depicted in FIG. 1 bear the same reference numerals and details thereof are thus omitted for simplicity.

Referring now to FIGS. 2 and 3, an incorporated capillary member 8 to construct an electric discharge path has a capillary member 1 made of SiC and having an outer diameter of 10 mm and a length of 30 mm and a cylindrical AlN envelope 6 having an outer diameter of 35 mm and a length of 40 mm. The SiC capillary member 1 is provided with a central hole 2 (a diameter of 3.5 mm) for the electric discharge path. On the inner face of the central hole 2, a TiC coating layer 3 having a thickness of 0.5 mm and an alumina coating layer 4 having that of 30 μm are deposited in order by a chemical vapor deposition (CVD) method. The AlN envelope 6 is provided with a concave portion having a diameter of 30 mm and a depth of 8 mm in a central portion of one end thereof and a convex portion having a diameter of 29 mm and a height of 2 mm in a central portion of the other end thereof. The envelope 6 is provided further with a through-hole for accommodating the above-mentioned SiC capillary member 1, the accommodating hole having a diameter of 10 mm and being made in the center of the envelope 6, and a plurality of gas return holes 5 (a diameter of 1.8 mm) and are constructed to surround the accommodating hole in a concentric configuration. The holes 5 may be constructed at the same angular intervals to surround the accommodating hole.

The SiC capillary member 1 is accommodated or incorporated in the AlN envelope 6 and then is airtightly secured to it by means of soldering glass such as fritted glass 7 at a temperature of about 700° C. under air.

Incidentally, the TiC coating layer 3 serves as a protective film for preventing sputtering of SiC due to electric discharge, while the alumina coating layer 4 serves as a protective film for preventing oxidation of the TiC coating layer during assembling of the laser tube.

Next a plurality of incorporated capillary members 8 are coaxially arranged along a capillary axis of the ion laser tube and in series connected and airtightly secured to one another by using soldering glass such as fritted glass 9 and an exclusive implement (not shown) in such a manner that the incorporated capillary members 8 are aligned to form a straight discharge path and straight gas return paths. In this case, the capillary members 1 are spaced apart from each other. It is to be understood that the number of the capillary members 8 to be connected, in other words the whole length of capillary, depends upon the desired laser power. For instance, in order to obtain the laser power of 4 Watts, the whole length of capillary in this embodiment is made to be as long as about 500–600 mm.

Thereafter, an end of a cylindrical borosilicate glass member 10 is connected and secured to each end of the outermost capillary members 8. Furthermore, each of a pair of metal dishes 13 equipped with the anode electrode 11 and the cathode electrode 12, respectively, is connected and secured to the other end of each borosilicate glass member 10 and a Brewster window 14 is secured to a tip end of a tubular member 19 extending outwardly from a central portion of each metal dish 13. Lastly, a prescribed amount of argon gas is sealed therein to complete the ion laser tube.

Figure 4:
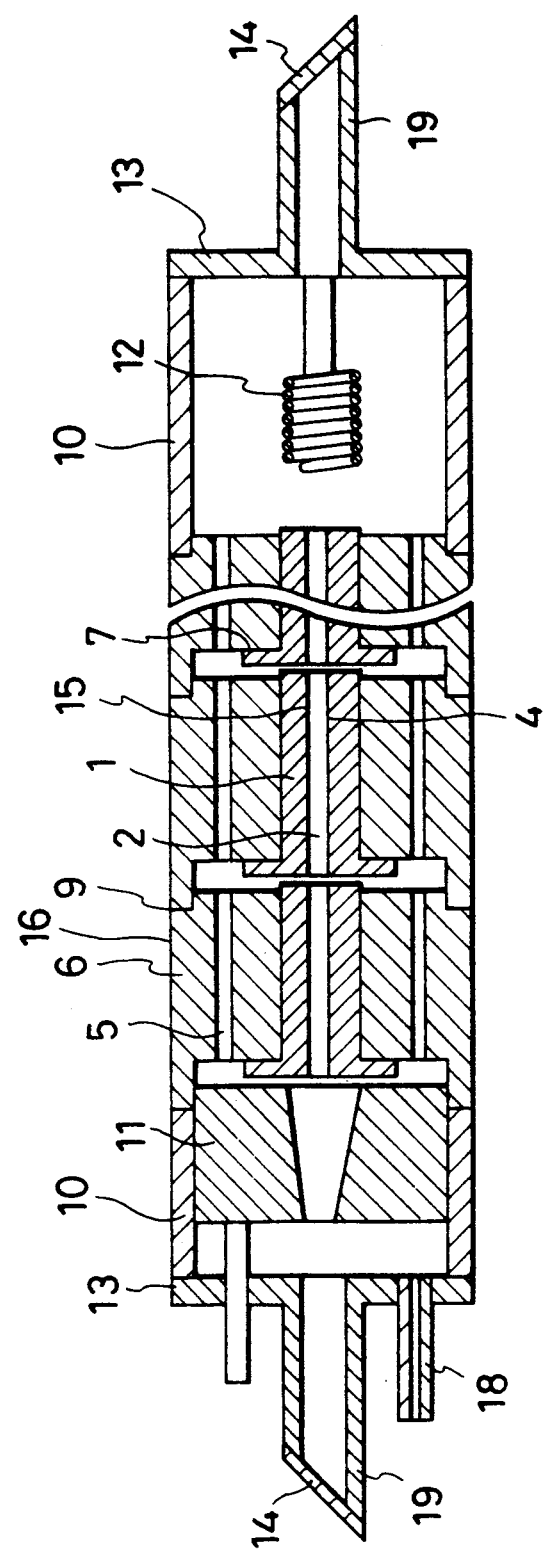
FIG. 4 shows a longitudinal section of an ion laser tube of a second embodiment according to this invention.
Figure 5:
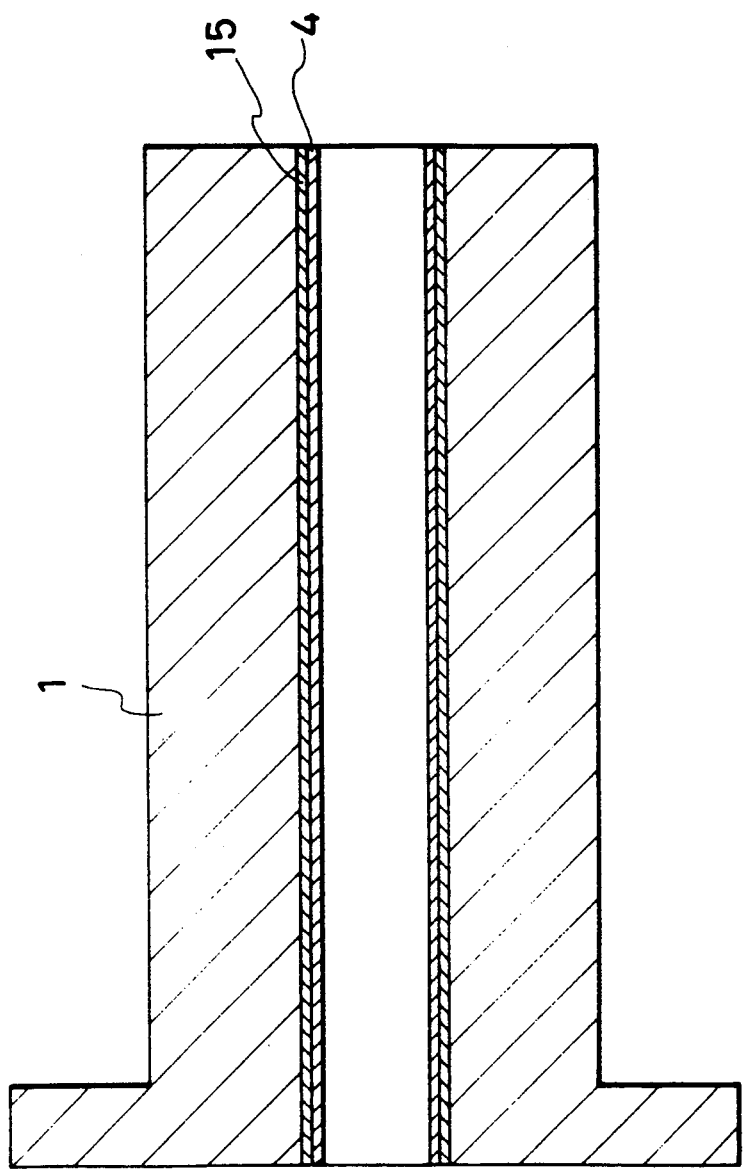
FIG. 5 shows an enlarged sectional view of an SiC capillary member in the ion laser tube shown in FIG. 4.

Next a second embodiment of this invention will be described with reference to FIGS. 4 and 5. FIG. 4 shows a longitudinal section of an ion laser tube according to the second embodiment and FIG. 5 shows an enlarged sectional view of an SiC capillary member 1 in the ion laser tube shown in FIG. 4. All parts and/or elements which are identical to those depicted in FIGS. 2 and 3 bear the same reference numerals and details thereof are thus omitted for simplicity.

In the second embodiment, a $B_4C$ coating layer is used as a protective film to attain the good durability to plasma bombardment. The inner face of the central hole 2 in the SiC capillary member 1 is coated with a $B_4C$ coating layer 15 having a thickness of 0.5 mm by the CVD method and then an alumina coating layer 4 having that of 30 μm.

The SiC capillary member 1 constructed as mentioned above is accommodated or incorporated in the AlN envelope 6 to assemble an incorporated capillary member 16. A plurality of assembled capillary members 16 are connected and airtightly secured to one another, and successively to the borosilicate glass members 10, the metal dish 13 equipped with the anode electrode 11 and the metal dish 13 with the cathode electrode 12 and further the Brewster windows 14 in the same manner as in the first embodiment, to thereby complete the ion laser tube of the second embodiment.

It has been found that a sputtering rate of TiC and $B_4C$ to electric discharge or several ions in the laser tube is 20–50% lower than that of SiC.

As discussed above, according to this invention, the inner face of the central hole in the SiC capillary member is coated with the coating layer comprising TiC or $B_4C$ and having excellent durability to plasma bombardment and further, thereon, the alumina coating layer for preventing oxidation of TiC and $B_4C$ during fabricating of the laser tube, to thereby lessen a stain of the Brewster window and change in a diameter of the central hole in the SiC capillary member, which are caused by sputtering of the SiC capillary member, and thus to obtain the laser tube with high laser power and long life and further high reliability. In addition, the ion laser tube is easily fabricated at a low cost.

While this invention has been particularly described with reference to the preferred embodiments thereof, it will be understood by those skilled in the art that the foregoing and other changes may be made therein without departing from the spirit and scope of the invention.

What is claimed is:

1. An ion laser tube having a plurality of cylindrical silicon carbide capillary members arranged along a laser axis of said laser tube; a plurality of cylindrical aluminum nitride envelopes, each of said capillary members having a central hole for an electric discharge path along said laser axis, each of said envelopes having a plurality of gas return holes and a through-hole for accommodating each of said capillary members therein, said envelopes, in each of which each of said capillary members is accommodated, being airtightly secured to one another so as to form said electric discharge path; and an anode electrode and a cathode electrode provided at both ends of said electric discharge path, respectively, and comprising having a first titanium carbide coating layer and a second alumina coating layer in order on an inner face of said hole for the electric discharge path.

2. The ion laser tube as defined in claim 1, wherein said first coating layer has a thickness of 0.5-1.0 mm and said second coating layer has that of 10-50 μm.

3. An ion laser tube having a plurality of cylindrical silicon carbide capillary members arranged along a laser axis of said laser tube; a plurality of cylindrical aluminum nitride envelopes, each of said capillary members having a central hole for an electric discharge path along said laser axis, each of said envelopes having a plurality of gas return holes and a through-hole for accommodating each of said capillary members therein, said envelopes, in each of which each of said capillary members is accommodated, being airtightly secured to one another so as to form said electric discharge path; and an anode electrode and a cathode electrode provided at both ends of said electric discharge path, respectively, and comprising having a first boron carbide coating layer and a second alumina coating layer in order on an inner face of said hole for the electric discharge path.

4. The ion laser tube as defined in claim 2, wherein said first coating layer has a thickness of 0.5-1.0 mm and said second coating layer has that of 10-50 μm.

* * * * *